(12) United States Patent
Yarrow

(10) Patent No.: US 12,444,895 B2
(45) Date of Patent: Oct. 14, 2025

(54) OPTICAL PULSE BURST FORMATION APPARATUS AND METHOD

(71) Applicant: NKT PHOTONICS A/S, Birkerød (DK)

(72) Inventor: Michael Yarrow, Fareham (GB)

(73) Assignee: NKT PHOTONICS A/S, Birkerød (DK)

( * ) Notice: Subject to any disclaimer, the term of this patent is extended or adjusted under 35 U.S.C. 154(b) by 527 days.

(21) Appl. No.: 17/921,765

(22) PCT Filed: Apr. 27, 2021

(86) PCT No.: PCT/EP2021/060950
§ 371 (c)(1),
(2) Date: Oct. 27, 2022

(87) PCT Pub. No.: WO2021/219615
PCT Pub. Date: Nov. 4, 2021

(65) Prior Publication Data
US 2023/0170659 A1    Jun. 1, 2023

(30) Foreign Application Priority Data
Apr. 27, 2020 (EP) .................................... 20171635

(51) Int. Cl.
*H01S 3/00* (2006.01)
*G02B 27/10* (2006.01)
*H01S 3/23* (2006.01)

(52) U.S. Cl.
CPC .......... *H01S 3/0057* (2013.01); *G02B 27/106* (2013.01); *H01S 3/0085* (2013.01); *H01S 3/2316* (2013.01)

(58) Field of Classification Search
CPC .... H01S 3/0057; H01S 3/0085; H01S 3/2316; H01S 3/005; H01S 3/2308; G02B 27/106
See application file for complete search history.

(56) References Cited

U.S. PATENT DOCUMENTS 6,141,127 A * 10/2000 Boivin .................... H04J 14/02
250/227.12
8,309,885 B2    11/2012 Peng et al.
(Continued)

FOREIGN PATENT DOCUMENTS

WO    2016096890 A1    6/2016
WO    2018108900 A1    6/2018

OTHER PUBLICATIONS

Hanlin et al., "A Reconfigurable High-Order UWB Signal Generation Scheme Using RSOA-MZI Structure", IEEE Photonics Journal, IEEE, USA, vol. 6, No. 2, Apr. 1, 2014, pp. 1-7, XP011541586.
(Continued)

*Primary Examiner* — Xinning(Tom) Niu
(74) *Attorney, Agent, or Firm* — Buchanan Ingersoll & Rooney PC

(57) ABSTRACT

An optical pulse generator arranged to generate an initial sequence of optical pulses having an initial inter-pulse period; and an optical pulse burst formation apparatus including: an interleaving stage to receive an initial sequence of optical pulses having an initial inter-pulse period, including: an optical splitter to power split received optical pulses, thereby generating a first and second replica sequences of optical pulses; a first optical arm to receive the first replica sequence, having a first optical path length; and a second optical arm to receive the second replica sequence, having a second optical path length, different to the first optical path length by a path length difference; and an optical combiner arranged to combine the first replica sequence of pulses and the second replica sequence of delayed pulses to form an output sequence of optical pulse bursts.

20 Claims, 7 Drawing Sheets

(56) References Cited

U.S. PATENT DOCUMENTS

| | | | |
|---|---|---|---|
| 8,569,675 B1 | 10/2013 | Yap et al. | |
| 2002/0085251 A1* | 7/2002 | Ofek | H04L 47/28 398/55 |
| 2002/0154394 A1* | 10/2002 | Hatami-Hanza | H01S 3/06754 359/349 |
| 2004/0253000 A1* | 12/2004 | Grifin | H04B 10/5051 398/183 |
| 2009/0072811 A1* | 3/2009 | Marciante | G01R 29/027 324/76.12 |
| 2009/0080895 A1* | 3/2009 | Zarris | H04J 14/08 398/98 |
| 2009/0273828 A1* | 11/2009 | Waarts | H01S 3/2383 359/341.1 |
| 2010/0177794 A1* | 7/2010 | Peng | B23K 26/0624 372/25 |
| 2012/0230353 A1 | 9/2012 | Xu et al. | |
| 2016/0181757 A1 | 6/2016 | Lührmann et al. | |
| 2017/0170621 A1* | 6/2017 | Miura | H01S 3/1305 |
| 2020/0091673 A1* | 3/2020 | Kim | H01S 3/137 |

OTHER PUBLICATIONS

Kienel et al., "Multidimensional coherent pulse addition of ultrashort laser pulses", Optics Letters, Optical Society of America, US, vol. 40, No. 4, Feb. 15, 2015, pp. 522-525, XP001593955.

International Search Report (PCT/ISA/210) and Written Opinion (PCT/ISA/237) mailed on Jul. 28, 2021, by the European Patent Office as the International Searching Authority for International Application No. PCT/EP2021/060950. (18 pages).

The extended European Search Report issued on Sep. 25, 2020, by the European Patent Office in European Patent Application No. 20171635.4-1212. (11 pages).

* cited by examiner

OPTICAL PULSE BURST FORMATION APPARATUS AND METHOD

The invention relates to optical pulse burst formation apparatus and to optical pulse burst generation apparatus. The invention further relates to a method of optical pulse burst formation.

Bursts of ultrashort optical pulses are used to achieve higher effective energy per pulse as compared to single pulses and are used to increase processing rates in ultrafast materials processing. Optical pulse bursts are typically formed by pulse picking bursts of optical pulses from a sequence of optical pulses, using, for example, an acousto-optic modulator, AOM, or an electro-optic modulator, EOM.

When generating complex burst structures where specific pulses inside a group of pulses are removed from a burst, the minimum separation between the pulses within the burst, which may be referred to as pulses, is limited by the seed pulse generator. In addition, tailoring the pulse amplitude envelope shape is limited by the rise and fall time of the AOM/EOM. Even though faster modulators are available, for example Lithium Niobate Mach-Zehnder Interferometer modulators, they suffer from thermal drift and minimum cavity lengths and required dispersion limits the maximum pulse repetition rate that can be generated using optical fibre or bulk optic modelocked oscillators.

Optical pulse sequences/trains having higher pulse repetition rates can be formed by interleaving optical pulse sequences using optical delay lines. The lengths of the delay lines are chosen so that the pulse repetition rate doubles with each interleaving stage while the time between pulses (the inter-pulse separation) halves while the pulses remain equally spaced in time. This allows higher pulse repetition rates to be achieved but still leaves the limitation, due to modulator rise time, of having to select whole pulses when creating a burst. Many interleaving stages are required to achieve a minimum inter-pulse separation, for example 1 ns, because the pulse repetition rate that can typically be generated by modelocked oscillators is limited to 50-100 MHz.

U.S. Pat. No. 8,309,885 describes a laser processing system according to one embodiment generates ultrafast laser pulses with a temporal programmable burst mode. A burst pulse laser includes a high repetition rate ultrafast laser configured to deliver a pulse train with each pulse in the train having an independently controlled amplitude. The respective amplitudes of each ultrafast pulse in a group or "burst" of pulses, along with the spacing between pulses, define a "burst envelope." In addition to independently controlling the amplitude of each ultrafast pulse in a burst of pulses, the system may also provide selective control of spacing between each ultrafast pulse and/or the overall temporal width of the burst envelope. Thus, the system provides selective shaping of the burst envelope for particular laser processing applications.

It is an object to provide an improved optical pulse burst formation apparatus. It is a further object to provide an improved optical pulse burst generation apparatus. It is a further object to provide an improved method of optical pulse burst formation.

An aspect of the invention provides optical pulse burst formation apparatus comprising an interleaving stage and an optical combiner. The interleaving stage is arranged to receive an initial sequence of optical pulses having an initial inter-pulse period. The interleaving stage comprises an optical splitter, a first optical arm and a second optical arm. The optical splitter is configured to power split received optical pulses, thereby generating a first replica sequence of pulses and a second replica sequence of pulses. The first optical arm is arranged to receive said first replica sequence. The first optical arm has a first optical path length. The second optical arm is arranged to receive said second replica sequence. The second optical arm has a second optical path length, different to the first optical path length by a path length difference. The path length difference is configured to apply a time delay to the pulses of the second replica sequence such that a relative time delay that is substantially less than half the initial inter-pulse period is introduced between pulses of said first replica sequence and pulses of said second replica sequence. The optical combiner is arranged to combine the first replica sequence of pulses and the second replica sequence of delayed pulses to thereby form an output sequence of optical pulse bursts. Each optical pulse burst comprises a pulse of the first replica sequence and a delayed pulse of the second replica sequence.

The apparatus may enable very closely spaced bursts of pulses to be formed, the pulses within the bursts being closer than is possible by prior art methods. The apparatus may also enable longer time gaps between adjacent bursts, long enough to allow a conventional modulator, such as a fibre coupled AOM, to switch states from open to closed and thereby pulse-pick down to lower burst repetition rates so that bursts can be amplified to high energy. The apparatus may enable precise adjustment of the pulse spacing and enables the pulse spacing not to be locked to being an integral multiple of the initial inter-pulse period. It may also enable a potential cost reduction for fixed pulse burst parameters and reduce the complexity of timing electronics required to form pulse bursts. The apparatus addresses the issue of the minimum separation between pulses in bursts being limited by either the minimum rise time of an optical modulator or the maximum repetition rate of the oscillator due to optical design constraints and manufacturing constraints.

In an embodiment, the apparatus comprises a plurality of said interleaving stage. pulsespulsespulsespulsespulsespulsespulses The optical combiner is instead configured to combine pulses pulses pulses pulses the first replica sequences of optical pulses and the second replica sequences of delayed optical pulses output from a plurality of the interleaving stages to thereby form an output sequence of optical pulse bursts, each burst comprising optical pulses of the first and second replica sequences of each of the interleaving stages. pulsespulses Advantageously, the number of pulses in a burst can be adjusted by changing the number of interleaving stages. The apparatus may enable very closely spaced bursts of pulses to be formed. The apparatus may enable the pulse spacing not to be locked to being an integral multiple of the initial inter-pulse period.

In an embodiment, a plurality of the interleaving stages are connected in parallel and a further one of said interleaving stages is connected in series with at least one of said interleaving stages connected in parallel.

In an embodiment, the further interleaving stage is connected in series with the plurality of interleaving stages connected in parallel.

In an embodiment, the further interleaving stage is connected in series with one of the plurality of interleaving stages connected in parallel.

In an embodiment, at least one optical arm includes variable delay apparatus configurable to implement one or more of a plurality of path length differences, to apply one or more of a plurality of time delays, such that one or more of a plurality of relative time delays is introduced.

The variable delay apparatus may be arranged in any optical arm of the optical pulse burst formation apparatus which introduces a delay to pulses, such as in the second optical arm. The variable delay apparatus provides the advantage that the time separation of pulses within a burst can be changed by adjusting the setting of the variable delay apparatus.

In some embodiments, the variable delay apparatus comprises an optical switch and two or more optical arms arranged to introduce different delays to received pulses such that the switch setting determines the delay applied to incoming pulses. The optical switch may be arranged upstream to the two or more optical arms and a combiner may arranged downstream to collect pulses from the selected optical arm. Alternatively, a splitter may be arranged upstream to the two or more optical arms with the optical switch arranged downstream to determine from which optical arm pulses are received from.

Advantageously, pulse separation within bursts can be adjusted by changing the length of the path length differences, which changes the applied time delays.

In an embodiment, the initial inter-pulse period is in the range 10-100 ns.

In an embodiment, the relative time delay is in the range 50 ps to 20 ns.

In an embodiment, the pulses have a pulse duration and the or each relative time delay is at least the pulse duration. This may ensure that pulses do not overlap in time, thereby preserving the compressibility of the pulse bursts.

In an embodiment, the pulses have a pulse duration and the or each relative time delay is less than the pulse duration. Enabling pulses to overlap may enable pulse width modulation.

In an embodiment, at least one optical arm includes a variable optical attenuator. This may enable the relative amplitudes of pulses within bursts to be adjusted by changing relative loss between each optical path using the variable optical attenuator. This may enable the amplitude envelope of pulse bursts to be controlled.

In an embodiment, the apparatus further comprises a pulse stretcher and a pulse compressor. The pulse stretcher is provided before the first interleaving stage. The pulse stretcher is configured to receive the initial sequence of optical pulses of a first pulse duration and is configured to stretch the optical pulses to a second, longer pulse duration. The pulse compressor is arranged to receive the sequence of optical pulse bursts. The pulses of the optical bursts have a first pulse duration and the pulse compressor is configured to compress the pulses to a second, shorter pulse duration. The pulse stretcher reduces the pulse peak power and therefore reduces the non-linear phase shift that occurs in the optical elements within the apparatus between the pulse stretcher and the pulse compressor.

In an embodiment, the second pulse duration is smaller than the minimum intra-burst pulse separation, i.e. smaller than any time delay between adjacent pulses in the burst. This allows for efficient compression of the burst pulses in the pulse compressor. The first pulse duration may be substantially equal to the second pulse duration.

In an embodiment, the apparatus further comprises a pulse picker. The pulse picker may be arranged downstream to the optical combiner and be configurable to transmit fewer than all of the optical pulse bursts in the sequence of optical pulse bursts. Providing a pulse picker may enable the pulse burst repetition rate to be reduced or the burst profile, pulse number and pattern within the burst to be adjusted. Including a pulse-picker may therefore provide additional control over the parameters of the burst sequence and may enable faster, or on-the-fly, changes in parameters.

Alternatively, the pulse picker may be arranged upstream to the first optical splitter to reduce the repetition rate of the initial sequence of optical pulses. The pulse picker can then control the burst repetition rate which often is identical to the repetition rate of the initial sequence of optical pulses.

In an embodiment, the or each time delay is configured such that adjacent bursts are separated in time by at least a rise time of the pulse picker. This may allow each pulse burst to be either fully selected or fully rejected by the pulse picker.

In an embodiment, the or each time delay is configured such that adjacent bursts are separated in time by at least 5 ns.

Corresponding embodiments and advantages apply to the optical pulse burst generation system and the method described below.

An aspect of the invention provides an optical pulse burst generation system comprising an optical pulse generator and optical pulse burst formation apparatus. The optical pulse generator is arranged to generate an initial sequence of optical pulses having an initial inter-pulse period. The optical pulse burst formation apparatus comprises an interleaving stage and an optical combiner. The interleaving stage is arranged to receive the initial sequence of optical pulses. The interleaving stage comprises an optical splitter, a first optical arm and a second optical arm. The optical splitter is configured to power split received optical pulses, thereby generating a first replica sequence of pulses and a second replica sequence of pulses. The first optical arm is arranged to receive said first replica sequence. The first optical arm has a first optical path length. The second optical arm is arranged to receive said second replica sequence. The second optical arm has a second optical path length, different to the first optical path length by a path length difference. The path length difference is configured to apply a time delay to the pulses of the second replica sequence such that a relative time delay that is substantially less than half the initial inter-pulse period is introduced between pulses of said first replica sequence and pulses of said second replica sequence. The optical combiner is arranged to combine the first replica sequence of pulses and the second replica sequence of delayed pulses to thereby form an output sequence of optical pulse bursts. Each optical pulse burst comprises a-pulse of the first replica sequence and a delayed pulse of the second replica sequence.

The optical pulse burst formation apparatus advantageously enables lower repetition rate optical pulse generators to be used to generate optical pulse bursts, which may enable optical pulse generators that generate optical pulses having a larger bandwidth and shorter pulse duration to be used that may not be stable operating at higher pulse repetition rates.

An aspect of the invention provides a method of forming optical pulse bursts. The method comprises steps of: receiving an initial sequence of optical pulses having an initial inter-pulse period; power splitting each optical pulse of the initial sequence of optical pulses, thereby generating a first replica sequence of pulses and a second replica sequence of pulses; applying a time delay to the pulses of the second replica sequence such that a relative time delay that is substantially less than half the initial inter-pulse period is introduced between pulses of said first replica sequence and pulses of said second replica sequence; and combining the first replica sequence of pulses and the second replica sequence of delayed pulses to thereby form an output sequence of optical pulse bursts, each optical pulse burst comprising a pulse of the first replica sequence and a delayed pulse of the second replica sequence.

Embodiments of the invention will now be described, by way of example only, with reference to the accompanying drawings.

Figure 1:
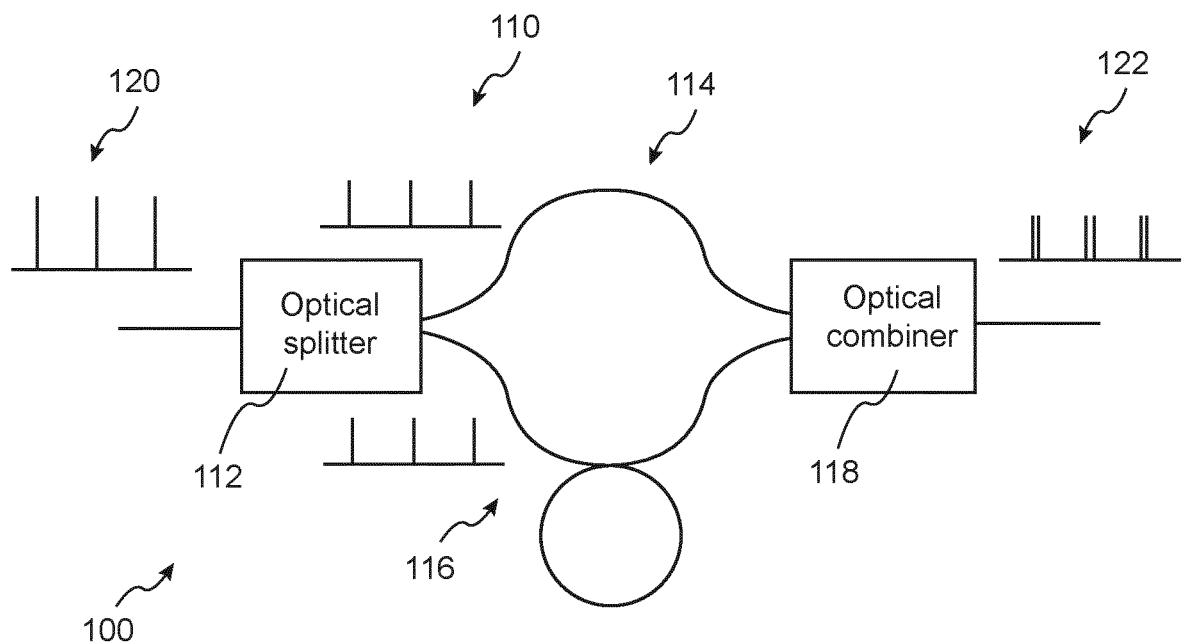
FIGS. 1 to 6, 8 and 9 are schematic representations of embodiments of optical pulse burst formation apparatus.

Referring to FIG. 1, an embodiment of the invention provides optical pulse burst formation apparatus 100 comprising an interleaving stage 110 and an optical combiner 118. The interleaving stage 110 is arranged to receive an initial sequence 120 of optical pulses having an initial inter-pulse period.

The interleaving stage comprises an optical splitter 112, a first optical arm 114 and a second optical arm 116. The optical splitter comprises an input, a first output and a second output. The optical splitter may, for example, be a fused optical fibre splitter or a bulk optic optical splitter. The optical splitter is configured to power split received optical pulses of the initial sequence of optical pulses into two replica pulses, thereby generating a first replica sequence of pulses, delivered to a first output of the optical splitter, and a second replica sequence of pulses, delivered to a second output of the optical splitter.

The first optical arm 114 has a first optical path length and is coupled to the first output of the optical splitter, to receive the first replica sequence of optical pulses. The second optical arm 116 has a second optical path length and is coupled to the second output of the optical splitter, to receive the second replica sequence of optical pulses. The second optical path length is different to the first optical path length by a path length difference. The path length difference is configured to apply a time delay to the pulses of the second replica sequence such that a relative time delay that is substantially less than half the initial inter-pulse period is introduced between pulses of the first replica sequence and pulses of the second replica sequence.

Substantially less will be understood to mean more than just the manufacturing tolerance variation that arises when delaying a pulse sequence by half the initial inter-pulse period, (it is not practical to achieve a delay of exactly half the initial inter-pulse period when doubling the repetition rate, as is done in prior art systems). For example, the initial inter-pulse period may be in the range 10-100 ns and a relative time delay in the range 1-20 ns introduced in the case of fs seed pulses, or as low as 50 ps in the case of ps seed pulses.

The optical combiner 118 has a first input coupled to the first optical arm, to receive the first replica sequence of optical pulses, a second input coupled to the second optical arm, to receive the second replica sequence of delayed pulses, and an output. The optical combiner may, for example, be a fused optical fibre combiner or a bulk optic combiner. The optical combiner is arranged to combine the first replica sequence of pulses and the second replica sequence of delayed pulses to form an output sequence 122 of optical pulse bursts. Each optical pulse burst comprises a pulse of the first replica sequence and a delayed pulse of the second replica sequence.

The optical pulses may be pulses of visible light or of light in the non-visible wavelength regimes, including, for example, light in the infrared, IR, or ultraviolet, UV, wavelength regime.

Figure 2:
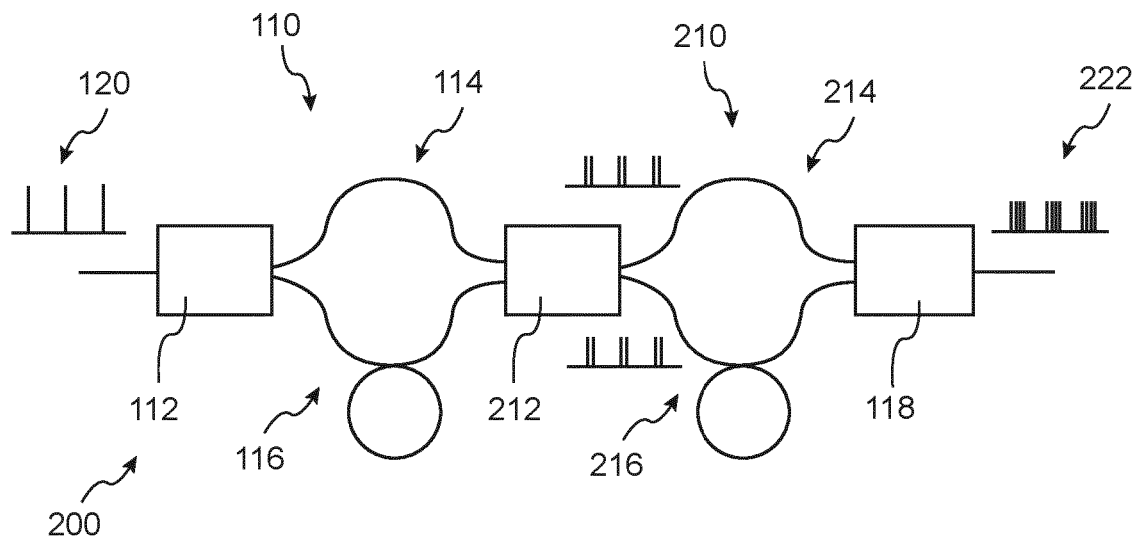

In an embodiment, illustrated in FIG. 2, the optical pulse burst formation apparatus 200 comprises two interleaving stages; a first interleaving stage 110 and a second interleaving stage 210. The second interleaving stage is arranged to receive the first replica sequence of pulses and the second replica sequence of delayed pulses from the first interleaving stage 110. The first interleaving stage 110 and the second interleaving stage 210 are arranged in series. The optical combiner 118 is provided at the output of the second interleaving stage.

The second interleaving stage is of the same construction as the first interleaving stage, described above with reference to FIG. 1. The second interleaving stage thus comprises an optical splitter 212, a first optical arm 214 and a second optical arm 216. The optical splitter comprises an input, a first output and a second output. The optical splitter 212 receives, at its input, the first replica sequence of pulses and the second replica sequence of delayed pulses from the first interleaving stage. The optical splitter is configured to power split received pulses of the first replica sequence and to power split received pulses of the second sequence, to thereby generate a third and a fourth replica sequence of pulses. Each of the third and fourth replica sequences of pulses comprises a replica of the pulses of the first replica sequence and a replica of the delayed pulses of the second replica sequence.

The first optical arm 214 has an optical path length and is coupled to the first output of the optical splitter 212, to receive the third replica sequence of optical pulses. The second optical arm 216 has an optical path length different to that of the first optical arm 214 by a path length difference. The second optical arm 216 is coupled to the second output of the optical splitter 212, to receive the fourth replica sequence of optical pulses. The path length difference is configured to apply a time delay to the pulses of the fourth replica sequence.

The optical combiner 118 has a first input coupled to the third optical arm, to receive the third replica sequence of optical pulses, a second input coupled to the fourth optical arm, to receive the fourth replica sequence of delayed pulses, and an output. The optical combiner 118 is configured to combine the third replica sequence of pulses and the fourth replica sequence of delayed pulses to thereby form an output sequence 222 of optical pulse bursts. Each optical pulse burst comprises pulses of the third replica sequence and delayed pulses of the fourth replica sequence, i.e. two replica pulses of the first replica sequence and two replica pulses of the second replica sequence, with the various time delays applied to form the optical pulse burst.

In an embodiment, the optical pulse burst formation apparatus comprises a plurality of interleaving stages. The optical combiner is configured to receive respective replica sequences of pulses and delayed pulses from a final one of the interleaving stages, and to combine these into optical pulse bursts, as described above.

In an embodiment, the path length difference of an interleaving stage is configured to apply a time delay to the second replica sequence of optical pulses such that there is a time delay of substantially less than half the initial inter-pulse period between optical pulses of the second replica sequence of optical pulses and corresponding optical pulses of the first replica sequence of optical pulses. This enables optical pulse bursts to be formed of replica pulses all of which originate from the same optical pulse of the initial sequence.

Figure 3:
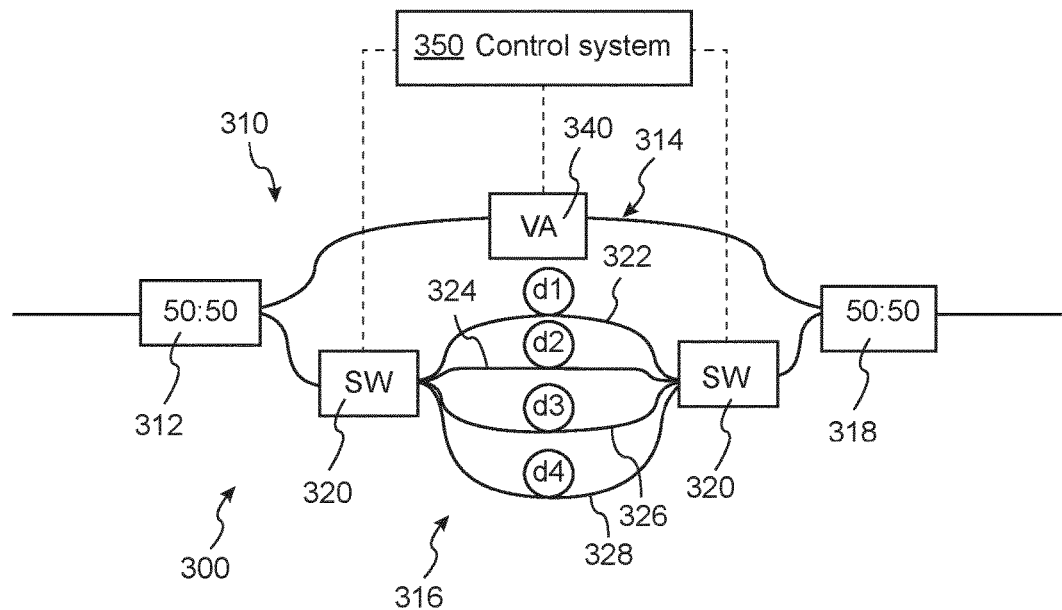

Referring to FIG. 3, in an embodiment the second optical arm 316 of the optical pulse burst formation apparatus 300 includes variable delay apparatus 320, 322, 324, 326, 328. The variable delay apparatus is configurable to implement one of a plurality of path length differences, to apply one of a plurality of time delays, such that one of a plurality of relative time delays is introduced.

In this example, the optical splitter 312 is a 50:50 optical splitter, the optical combiner is a 50:50 optical combiner and the variable delay apparatus comprises an input optical switch 320, four delay arms 322, 324, 326, 328 each comprising a respective delay line, d1, d2, d3, d4, and an output optical switch 330. Each of the delay lines has a different length, so that each of the delay arms has a different optical path length, to apply a different respective time delay. The delay lines may, for example, comprise standard single mode optical fibres, polarization maintaining optical fibres, dispersion shifted optical fibres, hollow core photonic crystal fibres, free space delay lines, which may be folded with mirrors, Micro-Electro-Mechanical Systems, MEMS, delay lines, micro-optic electronically variable delay lines or motorized variable free space delay lines.

The input optical switch 320 has an input and four outputs and is selectively reconfigurable to connect the input to any one of the four outputs, depending on which time delay has been selected to be applied. The output optical switch 330 has four inputs and an output and is selectively reconfigurable to connect any of the four inputs to the output, depending on which time delay has been selected to be applied.

Figure 7:
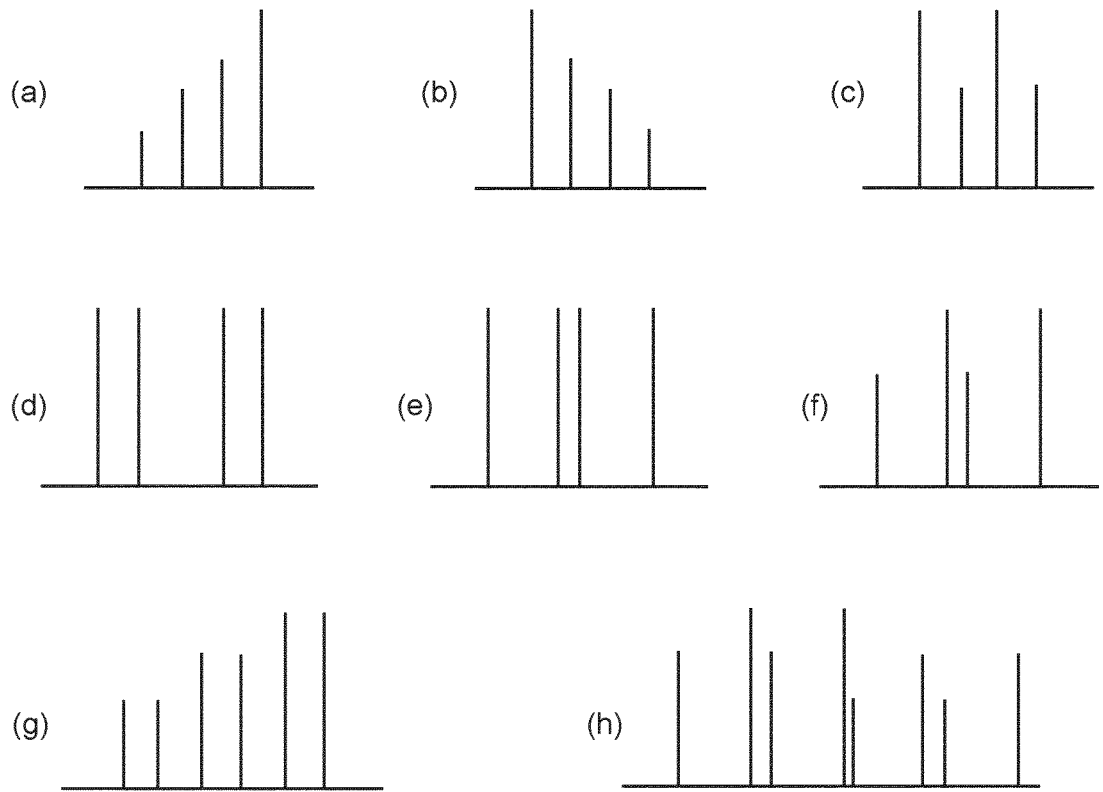
FIG. 7 illustrates amplitude envelopes of optical pulse bursts formed using the apparatus of FIGS. 1 to 6.

In this example, the apparatus 300 additionally comprises a variable optical attenuator 340 in the first optical arm 314. The variable optical attenuator may be a MEMs electronically variable optical fibre attenuator, a manual mechanical fibre optic attenuator or a free space variable attenuator, for example a variable neutral density, ND, filter or a waveplate and a polarizer. The amount of attenuation applied to the pulses of the first replica sequence may be varied using the variable optical attenuator, enabling the amplitude envelope of the optical pulse bursts to be controlled. Various amplitude envelopes that may be produced in this way are illustrated in FIG. 7.

The apparatus 300 further includes a control system 350 configured to control the settings of the switches 320 and the attenuation provided by the variable attenuator 350 to enable a pulse burst to be formed with a very wide range of burst parameters. The control system 350 is configured to determine which of the delay lines 322, 324, 326, 328 the input side switch 320 sends an incoming pulse into, and determines the attenuation provided by the variable attenuator.

The variable delay apparatus and variable attenuators advantageously provide for easy and fast adaptation of one or more of characteristics of the burst, including profile, intra-burst repetition-rate, relative peak power, and sequence of pulses within an optical pulse burst. This may be advantageous, for example, within materials processing in which cutting glass may be most efficient with one burst configuration while glass marking may be most efficient with another burst configuration. Appropriate changes to one or more characteristics of the optical pulse burst may also, for example, be made between laser processing of different objects, where the optimum optical pulse burst parameters differ for the objects.

In an embodiment, the pulses have a pulse duration and each relative time delay is equal to or greater than the pulse duration. The minimum length of the delay lines in the apparatus 300 of FIG. 3 is therefore determined by the pulse duration. A delay of at least the pulse duration is needed to form a sequence of optical pulse bursts.

In an alternative embodiment, the relative time delay can be less than the pulse duration, so pulses overlap. In this case the apparatus may be used to increase or modulate the output pulse duration as compared to the pulse duration of the initial optical pulses.

Figure 4:
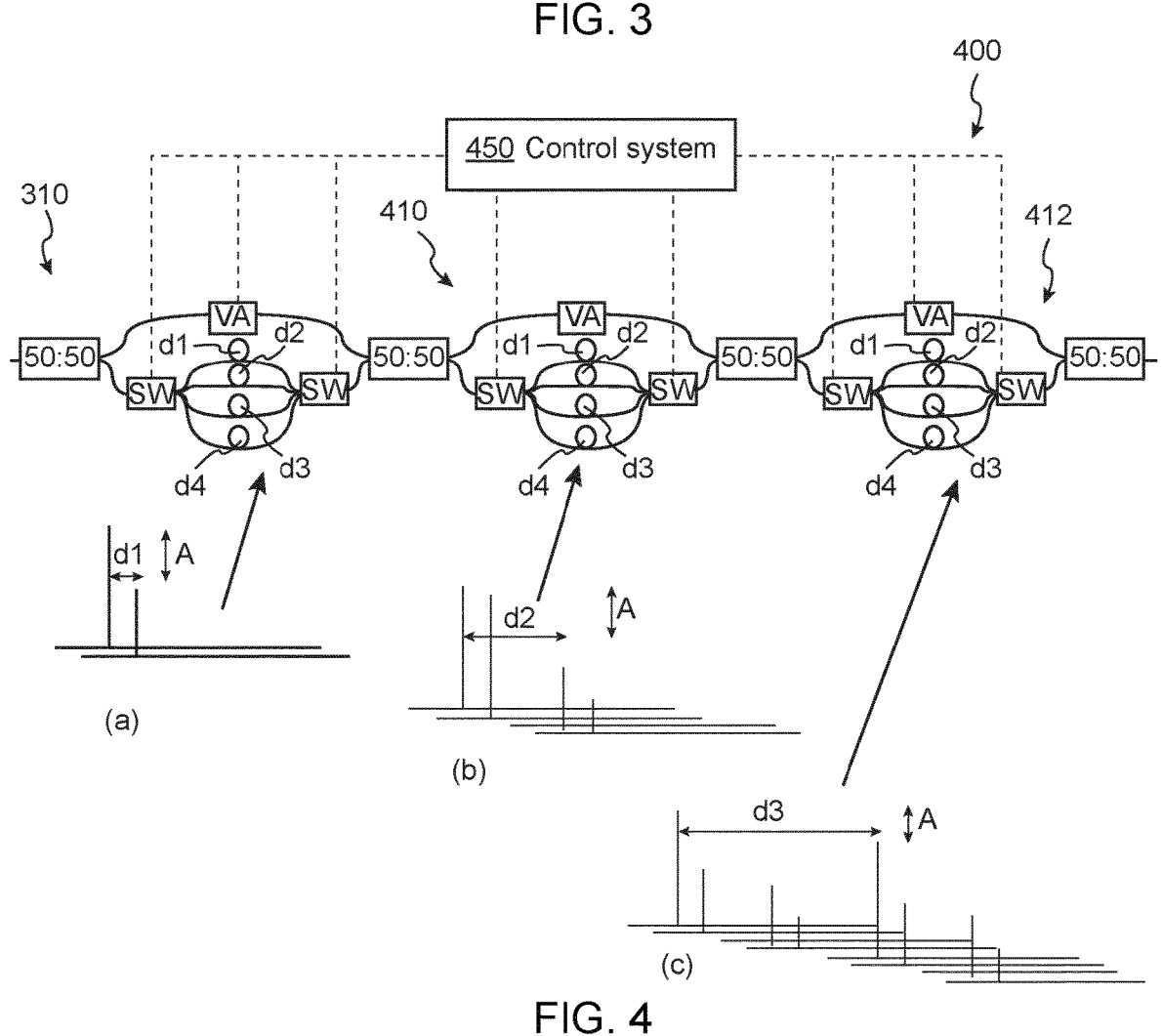

Referring to FIG. 4, an embodiment provides optical pulse burst formation apparatus 400 configurable to vary the number of pulses, the period between pulses (the "inter-pulse period") and the amplitude of the pulses within an optical pulse burst. The apparatus 400 comprises plurality of interleaving stages 310, 410, 412. The interleaving stages 310, 410, 412 are connected in series.

All three interleaving stages 310, 410, 412 have the same structure, as described with reference to FIG. 3. In addition, the attenuation of the variable optical attenuators 340 may be set to zero, to effectively make the first optical arm 314 of each stage a bypass arm.

The control system 450 is configured to control the settings of the switches 320 and the attenuation provided by the variable attenuators 340 in each interleaving stage, to enable a pulse burst to be formed with a very wide range of burst parameters. The control system 450 is configured to determine which of the delay lines 322, 324, 326, 328 the input side switch 320 sends an incoming pulse into, in each interleaving stage.

Formation of optical pulse bursts can be seen from the inset pulse graphs a), b) and c) of FIG. 4. In FIG. 4a, the pulse on the right has been transmitted along the first optical arm 314 of the first interleaving stage 310 and has had an attenuation A applied to it by the variable optical attenuator VA 340. The pulse on the left has been transmitted along the first, shortest, delay arm 322 and has had a time delay d1 applied to it.

The two pulses then proceed to the second interleaving stage 410, where they are power split as described above, sending respective replica sequences of two pulses, each comprising a replica of both pulses output from the first interleaving stage, into the first optical arm 314 and the second optical arm 316 of the second interleaving stage 410. The pulses on the right of FIG. 4b have been transmitted along the first optical arm 314 and have had a further attenuation A applied to them. The pulses on the left of FIG. 4b have been transmitted along the second optical arm 316, along the second delay arm 326 and have had a time delay d2 applied to them.

The four pulses then proceed to the third interleaving stage 412, where they are power split as described above, sending respective replica sequences of four pulses, each comprising a replica of the four pulses output from the second interleaving stage, into the first optical arm 314 and the second optical arm 316 of the third interleaving stage 412. The pulses on the right of FIG. 4c have been transmitted along the first optical arm 314 and have had a further attenuation A applied to them. The pulses on the left of FIG. 4c have been transmitted along the second optical arm 316, along the third delay arm 328 and have had a time delay d3 applied to them.

The sequence of attenuated pulses output from the first arm of the third interleaving stage are combined with the delayed pulses output from the second arm of the third interleaving stage in the optical combiner 318, provided after the third interleaving stage, to form a sequence of optical pulse bursts.

Figure 5:
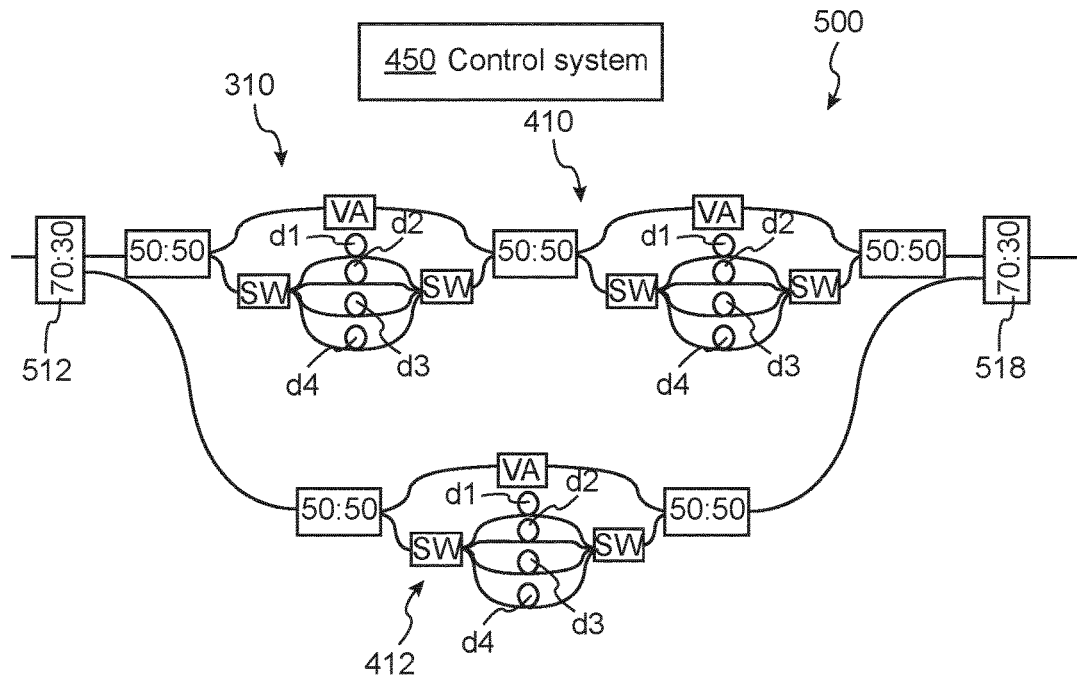

Referring to FIG. 5, an embodiment provides optical pulse burst formation apparatus 500 configurable to vary the number of pulses, the period between pulses (the "inter-pulse period") and the amplitude of the pulses within an optical pulse burst. Similarly to the apparatus 400 of FIG. 4, the apparatus 500 of this embodiment comprises a plurality of interleaving stages 310, 410, 412.

In this embodiment, two of the interleaving stages 310, 410 are connected in series, with a further interleaving stage 412 connected in parallel to them, via an additional optical splitter 512 and an additional optical combiner 518.

The additional optical splitter 512 comprises an input, a first output and a second output. The additional optical splitter is a 70:30 optical splitter configured to power split each optical pulse of the initial sequence of optical pulses in a 70:30 ratio, thereby generating a first replica sequence of pulses having 70% of the input pulse amplitude, delivered to a first output of the optical splitter, and a second replica sequence of pulses, having 30% of the input pulse amplitude, delivered to a second output of the optical splitter. The input of the optical splitter 312 of the first interleaving stage is coupled to the first output of the additional optical splitter 512 and the input of the optical splitter 312 of the second additional interleaving stage 412 is coupled to the second output of the additional optical splitter 512. The sequence of 70% power pulses, i.e. having the higher optical power, is delivered to the series of interleaving stages 310, 410, since these pulses will undergo additional power splitting compared to those transmitted to the further interleaving stage 412.

The control system 450 is configured to control the settings of the switches 320 and the attenuation provided by the variable attenuators 340 in each interleaving stage, to enable an optical pulse burst to be formed with a very wide range of burst parameters. The control system 450 is configured to determine which of the delay lines 322, 324, 326, 328 the input side switch 320 sends an incoming pulse into, in each interleaving stage. The connections between the control system and the switches and variable attenuators are not show in FIG. 5 for reasons of clarity.

Figure 6:
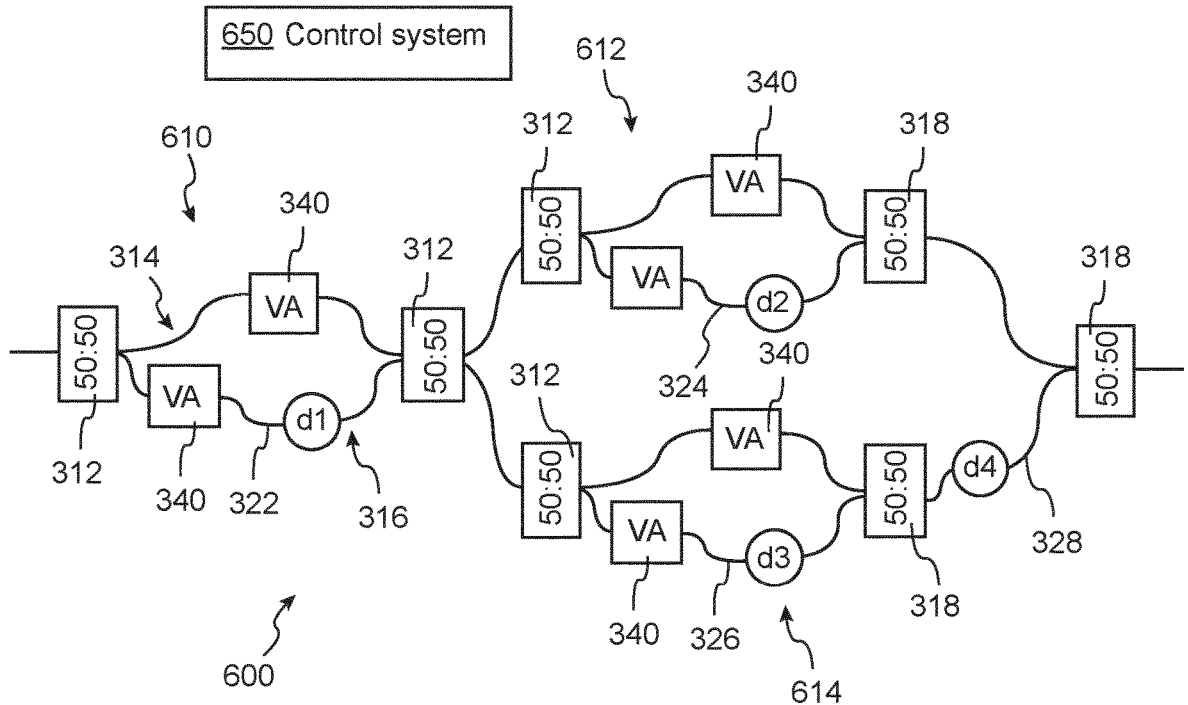

Referring to FIG. 6, an embodiment provides optical pulse burst formation apparatus 600 configurable to vary the number of pulses, the period between pulses (the "inter-pulse period") and the amplitude of the pulses within a burst. Similarly to the apparatus 400 of FIG. 4, the apparatus 600 of this embodiment comprises a plurality of interleaving stages 610, 612, 614. Two interleaving stages 612, 614 are connected in parallel and a further interleaving stage 610 is connected in series with the parallel interleaving stages 612, 614, connected by a 50:50 optical splitter 312. An additional optical combiner 318 is provided to combine the replica sequences of optical pulses output from the parallel interleaving stages 612, 614.

In this embodiment, the first optical arm 314 of each interleaving stage 610, 612, 614 comprises a variable optical attenuator 340 and the second optical arm 316 of each interleaving stage comprises a variable optical attenuator 340 and a delay line. The delay lines have respective, different lengths to apply respective, different time delays d1, d2, d3. A fourth delay line, configured to apply a time delay d4, is provided following the optical combiner 318 of one of the parallel interleaving stages 614. A relative time delay may thereby be applied between the sequence of optical pulse bursts output from one parallel interleaving stage 612 and the sequence of optical pulse bursts output from the other parallel interleaving stage 614, before being combined by the final optical combiner 318.

The apparatus 600 may include a control system 650 configured to control the attenuation provided by the variable attenuators 340 in each interleaving stage, to enable an optical pulse burst to be formed with a very wide range of amplitude envelopes. The connections between the control system and the variable attenuators are not show in FIG. 6 for reasons of clarity.

FIG. 7 illustrates various optical pulse burst amplitude envelopes which may be formed using the optical pulse burst formation apparatus 300, 400, 500, 600 described above.

Figure 8:
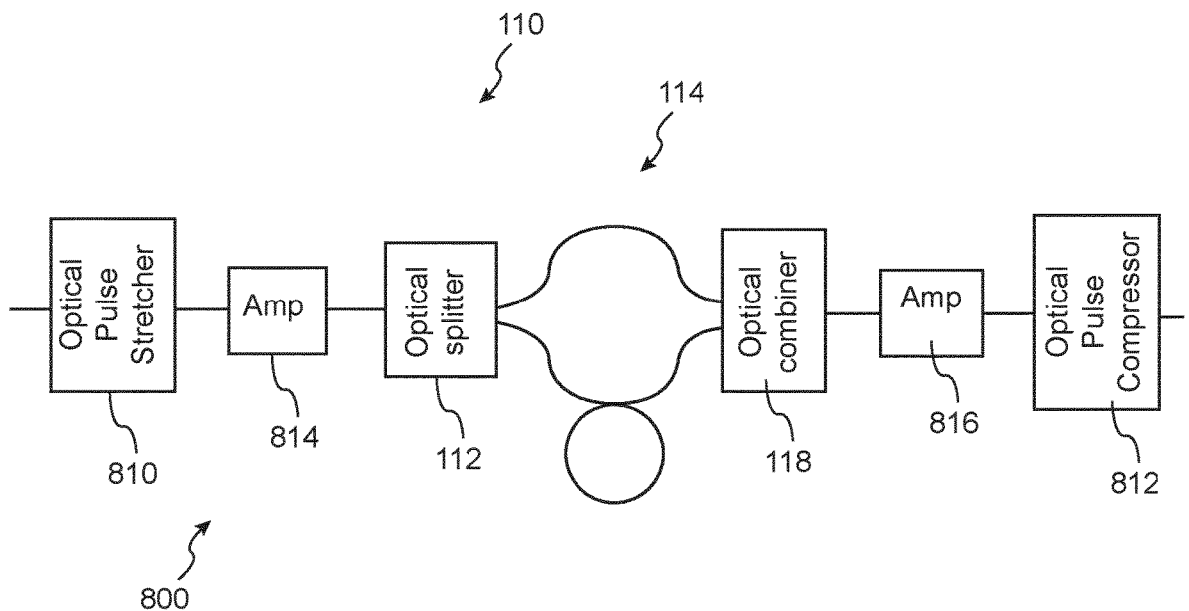

In an embodiment, illustrated in FIG. 8, the optical pulse burst formation apparatus 800 further comprises first and second optical amplifiers 814, 816, a pulse stretcher 810 and a pulse compressor 812. The pulse stretcher 810 and the first amplifier 814 are provided before the interleaving stage 14. The second amplifier 816 and the pulse compressor 812 are provided after the optical combiner 118, arranged to receive the output sequence of optical pulse bursts output from the optical combiner 118.

The pulse stretcher 812 is configured to receive the initial sequence of optical pulses, having a first pulse duration, and is configured to stretch the optical pulses to a second, longer pulse duration. The pulse stretcher reduces the pulse peak power by increasing the pulse width/duration. This has the advantage of reducing the impact of non-linear phase shift in the optical amplifiers 814, 816 between the pulse stretcher and the pulse compressor. The pulses of the optical pulse bursts received by the pulse compressor 814 have a first pulse duration (generally, the second pulse duration)

The pulse compressor is configured to compress the pulses to a second, shorter pulse duration, which may be shorter than the first pulse duration, to increase the pulse peak power.

Figure 9:
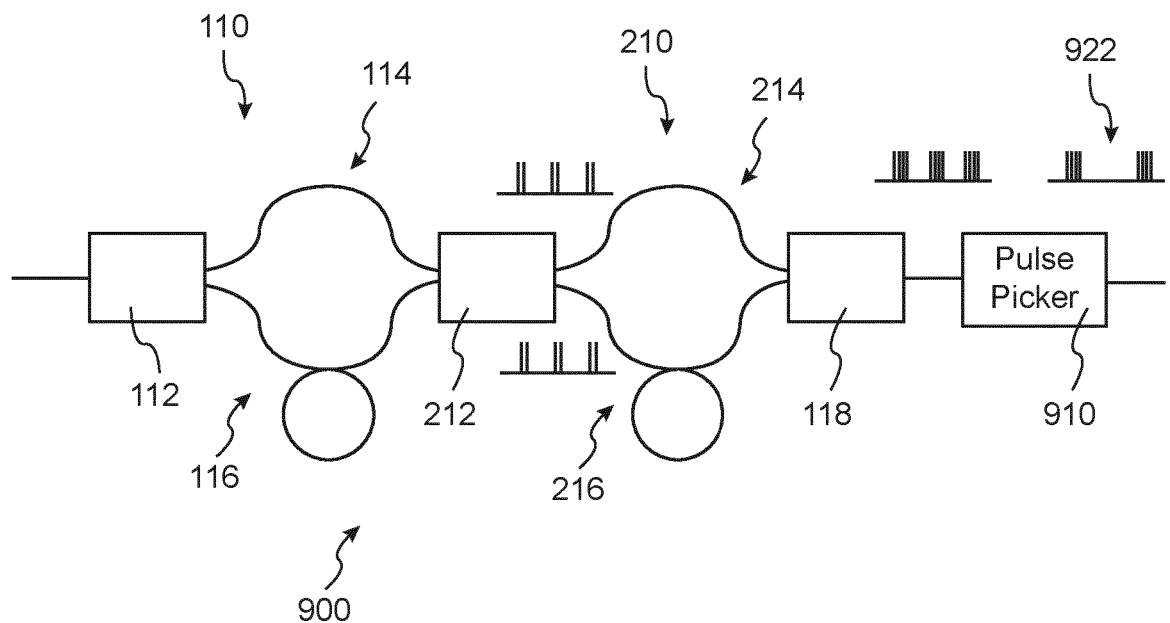

In an embodiment, illustrated in FIG. 9, the optical pulse burst formation apparatus 900 further comprises a pulse picker 910, arranged to receive the sequence of optical pulse bursts from the optical combiner 118. The pulse picker is configurable to transmit fewer than all of the optical pulse bursts, i.e. to pick some of the pulse bursts and to reject/block others. In this way the optical pulse burst repetition rate may be reduced.

In an embodiment, the or each time delay that is applied is configured such that adjacent bursts are separated in time by at least a rise time of the pulse picker. The time delays may be configured such that adjacent bursts are separated in time by at least 5 ns, around 5-6 ns being a typical rise time of an optical modulator that may be used as a pulse picker.

In an alternative embodiment, the pulse picker is arranged upstream to the first optical splitter to reduce the repetition rate of the initial sequence of optical pulses. The pulse picker can then control the burst repetition rate which often is identical to the repetition rate of the initial sequence of optical pulses. Providing the pulse picker upstream may remove the limit on the burst envelope width being >5 ns smaller that the initial inter-pulse period. If you pulse pick down to, say, 1 MHz before the burst formation apparatus, a much larger range of possible delay lines may be used, for example 1-500 ns instead of 1-20 ns.

Figure 10:
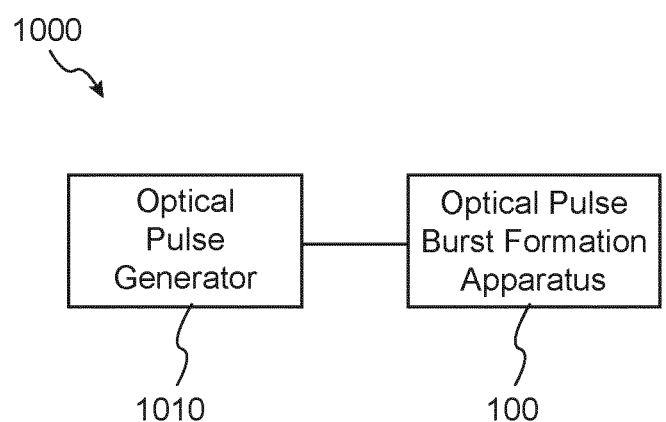
FIGS. 10 to 12 are schematic representations of embodiments of optical pulse burst generation apparatus.

Referring to FIG. 10, an embodiment provides an optical pulse generation system 1000 comprising an optical pulse generator 1010 and optical pulse burst formation apparatus 100.

The optical pulse generator 1010 is arranged to generate an initial sequence of optical pulses. The optical pulse burst formation apparatus 100, as described above with reference to FIG. 1, is arranged to receive the initial sequence of optical pulses from the optical pulse generator and form optical pulse bursts. It will be appreciated that any of the optical pulse burst formation apparatus 200, 300, 400, 500, 600, 800, 900 described above may alternatively be used.

The optical pulse generator may, for example, be a modelocked oscillator, a pulsed laser, a laser and an amplifier, or a laser and a fiber amplifier. It is configured to generate an initial sequence of optical pulses with a pulse width in the order of femtoseconds, picosecond or nanoseconds. The initial sequence of optical pulses comprises an initial number of optical pulses within a predefined time period n·T, where T is the pulse period and is inversely proportional to the pulse repetition rate of the initial sequence of optical pulses and n is a natural number.

Figure 11:
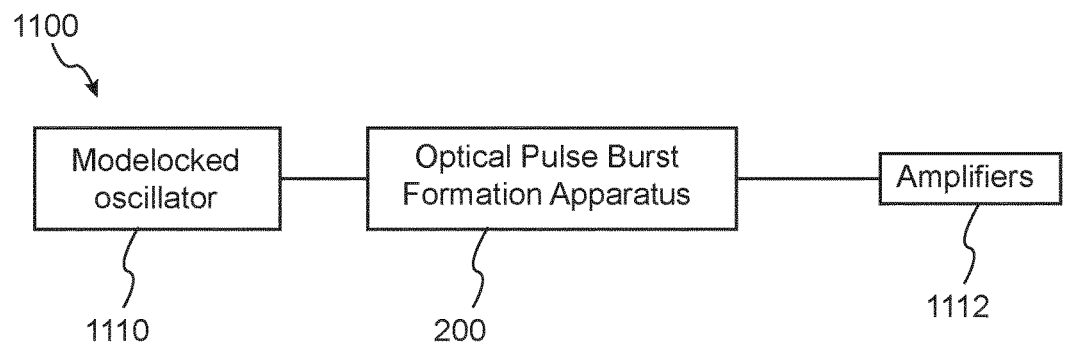

In an embodiment, as illustrated in FIG. 11, the optical pulse generation system 1100 comprises a modelocked oscillator 1110 as the optical pulse generator, optical pulse burst formation apparatus 200 as described above with reference to FIG. 2 and amplifiers 1112. The system 1100 is suitable for generating optical pulse bursts for quasi continuous wave, QCW, applications.

The amplifiers 1112 are provided after the optical pulse burst formation apparatus 200 and are configured to amplify the pulses in the optical pulse bursts 222, to compensate for any optical losses in the optical pulse burst formation apparatus 200.

In an embodiment, where optical pulse burst formation apparatus 300, 400, 500, 600 comprising one or more variable attenuators is used, the variable attenuators may be configured to compensate for gain saturation effects in the downstream optical amplifiers 1112, such that the burst envelope after the amplifiers has a flat-topped shape i.e. the pulses within the burst envelope have equal amplitudes.

Figure 12:
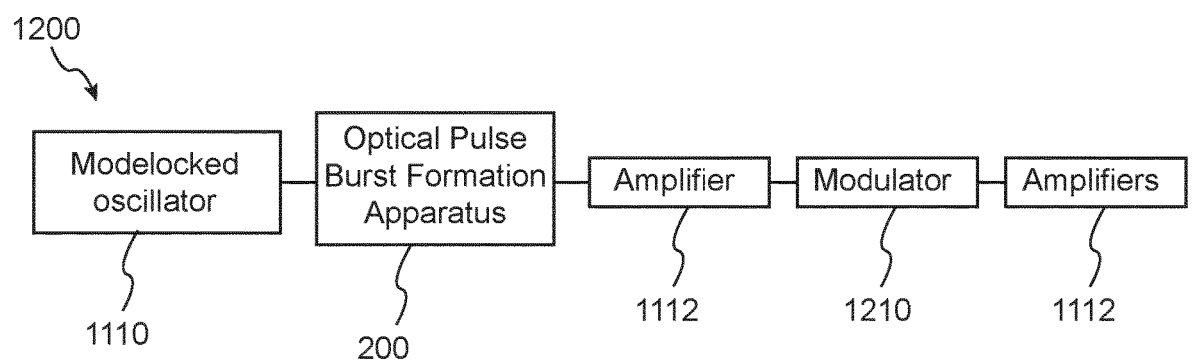

In an embodiment, as illustrated in FIG. 12, the optical pulse generation system 1200 further comprises a pulse picker, in the form of an optical modulator 1210, and a further amplifier stage 1112 after the optical modulator. The optical modulator enables the pulse burst repetition rate to be reduced and the pulse energy to be increased with subsequent amplification stages. Generally, the lower the repetition rate, the more pulse energy can be extracted from an optical amplifier, due to the greater stored energy (population inversion density) within the amplifier, for a given average power of the pulsed output.

A pulse picker is a device that "picks" or selects some of the pulses in a sequence of pulses, or, as in this case, some of the burst in the optical pulse burst sequence, thereby reducing (or keeping unaltered if all the pulses are selected) the repetition rate of the sequence of pulse bursts. A pulse picker is a standard optical device and an acousto-optic or electro-optic modulator can be used for this purpose.

In an embodiment, a further amplifier stage may be provided between the modelocked oscillator and the optical pulse burst formation apparatus 200 to overcome any optical losses in the optical pulse burst formation apparatus.

Figure 13:
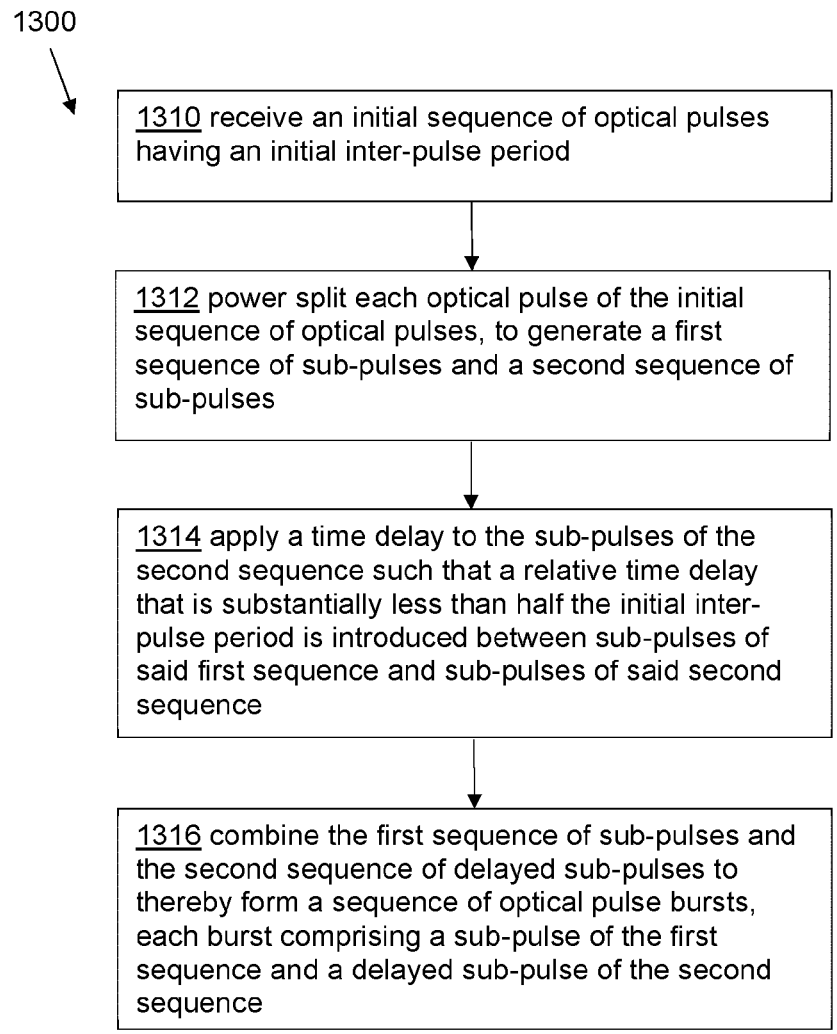
FIG. 13 is a flow chart illustrating steps of an embodiment of a method of optical pulse burst formation.

An embodiment of the invention provides a method 1300 of forming optical pulse bursts, as illustrated in FIG. 13.

The method comprises receiving 1310 an initial sequence of optical pulses having an initial inter-pulse period. The method proceeds to power splitting 1312 each optical pulse of the initial sequence of optical pulses, thereby generating a first replica sequence of pulses and a second replica sequence of pulses. The method comprises applying 1314 a time delay to the pulses of the second replica sequence such that a relative time delay of that is substantially less than half the initial inter-pulse period is introduced between pulses of said first replica sequence and pulses of said second replica sequence. The method comprises combining 1316 the first replica sequence of pulses and the second replica sequence of delayed pulses to thereby form an output sequence of optical pulse bursts. Each optical pulse burst comprises a pulse of the first replica sequence and a delayed pulse of the second replica sequence.

In an embodiment, the method comprises taking an incoming pulse train from a free running optical pulse source, such as a mode-locked oscillator, and power splitting and combining (interleaving) the pulse train with delay lines such that the time gaps between recombined pulses are not equal. By this method it is possible to produce bursts of very closely spaced pulses, closer than is possible by prior art methods. The method also enables time gaps to be formed between adjacent bursts which are long enough to allow a conventional optical modulator, such as a fibre coupled AOM, to switch states from open to closed and thereby pulse-pick down to lower burst repetition rates so that the bursts can be amplified to high energy. The number of pulses in a burst, the space between pulses in the bursts and the relative amplitudes of pulses within the bursts can all be adjusted by changing the number of interleaving stages, the length of the delay lines and the relative loss between each optical path (using variable attenuators), as described above with reference to FIGS. 2 to 7.

In some embodiments, the apparatus comprises or is connected to a control unit configured for controlling the settings on one or more components of the apparatus, such as the settings on the one or more variable attenuators, the one or more optical switches and/or of the seed pulse generator. The control unit may comprise a computer device comprising a computer readable medium and a microprocessor where the computer readable medium is encoded with algorithms for controlling the settings. The control unit may further comprise a visual display unit, such as a computer screen, and a computer keyboard and a computer mouse for entering data and activating virtual buttons visualized on the visual display unit and providing means for changing the settings. The control unit preferably allows for adjusting the settings to select settings according to a desired burst profile for a specific application, e.g. during use in an material processing application where different burst profiles may be preferred for different parts of the processing.

Items:

1. Optical pulse burst formation apparatus (100, 200, 300, 400, 500, 600, 800, 900) comprising:
   a first interleaving stage (110, 310, 610) arranged to receive an initial sequence (120) of optical pulses having an initial inter-pulse period, the first interleaving stage comprising:
   an optical splitter (112, 312) configured to power split each optical pulse of the initial sequence of optical pulses, thereby generating a first sequence of sub-pulses and a second sequence of sub-pulses;
   a first optical arm (114, 314) arranged to receive said first sequence, the first optical arm having a first optical path length; and
   a second optical arm (116, 316) arranged to receive said second sequence, the second optical arm having a second optical path length, different to the first optical path length by a path length difference, the path length difference configured to apply a time delay to the sub-pulses of the second sequence such that a relative time delay that is substantially less than half the initial inter-pulse period is introduced between sub-pulses of said first sequence and sub-pulses of said second sequence; and an optical combiner (118, 318) arranged to combine the first sequence of sub-pulses and the second sequence of delayed sub-pulses to thereby form a sequence (122) of optical pulse bursts, each burst comprising a sub-pulse of the first sequence and a delayed sub-pulse of the second sequence.

2. The apparatus of item 1, comprising an additional interleaving stage (210, 410, 612, 614) arranged to receive the first sequence of sub-pulses and the second sequence of delayed sub-pulses, said additional interleaving stage comprising:
an optical splitter (212, 312) configured to power split each sub-pulse of the first sequence and configured to power split each delayed sub-pulse of the second sequence, thereby generating a third sequence of sub-pulses and a fourth sequence of sub-pulses, the sub-pulses of each said sequence comprising replicas of the sub-pulses of both the first and second sequences;
a third optical arm (214) arranged to receive said third sequence, the third optical arm having a third optical path length; and
a fourth optical arm (216) arranged to receive said fourth sequence, the fourth optical arm having a fourth optical path length, different to the third optical path length by a path length difference, the path length difference configured to apply a time delay to the sub-pulses of the fourth sequence,
wherein the optical combiner (118, 318) is configured to combine the third sequence of sub-pulses and the fourth sequence of delayed sub-pulses to thereby form a sequence (222) of optical pulse bursts each comprising sub-pulses of the third sequence and delayed sub-pulses of the fourth sequence.

3. The apparatus of item 2, comprising a plurality of said additional interleaving stages (410, 412, 612, 614), wherein the optical combiner is configured to receive from a final said additional interleaving stage respective sequences of sub-pulses and delayed sub-pulses.

4. The apparatus of item 2 or item 3, wherein a plurality of said interleaving stages are arranged in series and/or a plurality of said interleaving stages are arranged in parallel.

5. The apparatus of any preceding item, wherein the path length difference of the first interleaving stage is configured to apply a time delay to the second sub-sequence of optical pulses such that there is a time delay of substantially less than half the initial inter-pulse period between optical pulses of the second sub-sequence of optical pulses and corresponding optical pulses of the first sub-sequence of optical pulses.

6. The apparatus of any preceding item, wherein at least one optical arm includes variable delay apparatus (320, 322, 324, 326, 328) configurable to implement one or more of a plurality of path length differences, to apply one or more of a plurality of time delays, such that one or more of a plurality of relative time delays is introduced.

7. The apparatus of any preceding item, wherein the variable delay apparatus comprises an optical switch and two or more optical arms arranged to introduce different delays to received pulses such that the switch setting determines the delay applied to incoming pulses.

8. The apparatus of any preceding item, wherein the sub-pulses have a pulse duration and wherein the or each relative time delay is at least the pulse duration.

9. The apparatus of any preceding item, wherein at least one optical arm includes a variable optical attenuator (340).

10. The apparatus of preceding item, further comprising:
a pulse stretcher (812) provided before the first interleaving stage, the pulse stretcher configured to receive the initial sequence of optical pulses of a first pulse duration and configured to stretch the optical pulses to a second, longer pulse duration; and
a pulse compressor (814) arranged to receive the sequence of optical pulse bursts, the sub-pulses of the optical bursts having a first sub-pulse duration, and configured to compress the sub-pulses to a second, shorter sub-pulse duration.

11. The apparatus of any preceding item, further comprising a pulse picker (910) configurable to transmit fewer than all of the optical pulse bursts in the sequence of optical pulse bursts.

12. The apparatus of item 11, wherein the or each time delay is configured such that adjacent bursts are separated in time by at least a rise time of the pulse picker.

13. The apparatus of any preceding item, wherein the or each time delay is configured such that adjacent bursts are separated in time by at least 5 ns.

14. An optical pulse burst generation system (1000, 1100, 1200) comprising: an optical pulse generator (1010, 1110) arranged to generate an initial sequence of optical pulses; and
optical pulse burst formation apparatus (100, 200, 300, 400, 500, 600, 800, 900) according to any of claims 1 to 12.

15. A method (1300) of forming optical pulse bursts, the method comprising steps of:
receiving (1310) an initial sequence of optical pulses having an initial inter-pulse period;
power splitting (1312) each optical pulse of the initial sequence of optical pulses, thereby generating a first sequence of sub-pulses and a second sequence of sub-pulses;
applying (1314) a time delay to the sub-pulses of the second sequence such that a relative time delay that is substantially less than half the initial inter-pulse period is introduced between sub-pulses of said first sequence and sub-pulses of said second sequence; and
combining (1316) the first sequence of sub-pulses and the second sequence of delayed sub-pulses to thereby form a sequence of optical pulse bursts, each burst comprising a sub-pulse of the first sequence and a delayed sub-pulse of the second sequence.

The invention claimed is:
1. An optical pulse burst generation system comprising:
an optical pulse generator arranged to generate an initial sequence of optical pulses having an initial inter-pulse period; and
an optical pulse burst formation apparatus comprising:
an interleaving stage arranged to receive the initial sequence of optical pulses having the initial inter-pulse period, the interleaving stage comprising:
an optical splitter configured to power split received optical pulses, thereby generating a first replica sequence of optical pulses and a second replica sequence of optical pulses;
a first optical arm arranged to receive said first replica sequence, the first optical arm having a first optical path length; and
a second optical arm arranged to receive said second replica sequence, the second optical arm having a second optical path length, different to the first optical path length by a path length difference, the path length difference configured to apply a time delay to the optical pulses of the second replica sequence such that a relative time delay that is substantially less than half the initial inter-pulse period is introduced between optical pulses of said first replica sequence and optical pulses of said second replica sequence; and an optical combiner arranged to combine the first replica sequence of optical pulses and the second replica sequence of delayed optical pulses to thereby form an output sequence of optical pulse bursts, each burst comprising an optical pulse of the first replica sequence and a delayed optical pulse of the second replica sequence.

2. The system as claimed in claim 1, comprising a plurality of said interleaving stage, wherein the optical combiner is configured to combine the first replica sequences of optical pulses and the second replica sequences of delayed optical pulses output from a plurality of the interleaving stages to thereby form an output sequence of optical pulse bursts, each burst comprising optical pulses of the first and second replica sequences of each of the interleaving stages.

3. The system as claimed in claim 2, wherein a plurality of the interleaving stages are connected in parallel and a further one of said interleaving stages is connected in series with at least one of said interleaving stages connected in parallel.

4. The system as claimed in claim 3, wherein the further interleaving stage is connected in series with the plurality of interleaving stages connected in parallel.

5. The system as claimed in claim 3, wherein the further interleaving stage is connected in series with one of the plurality of interleaving stages connected in parallel.

6. The system as claimed in claim 1, wherein the optical pulses have a pulse duration and wherein the or each relative time delay is at least the pulse duration.

7. The system as claimed in claim 1, further comprising:
a pulse stretcher provided before the first interleaving stage, the pulse stretcher configured to receive the initial sequence of optical pulses of a first pulse duration and configured to stretch the optical pulses to a second, longer pulse duration; and
a pulse compressor arranged to receive the sequence of optical pulse bursts, the optical pulses of the optical bursts having a first pulse duration, and configured to compress the optical pulses to a second, shorter pulse duration.

8. The system as claimed in claim 1, further comprising a pulse picker configurable to transmit fewer than all of the optical pulse bursts in the sequence of optical pulse bursts.

9. The system as claimed in claim 8, wherein the or each time delay is configured such that adjacent bursts are separated in time by at least a rise time of the pulse picker.

10. The system as claimed in claim 1, wherein the or each time delay is configured such that adjacent bursts are separated in time by at least 5 ns.

11. The system as claimed in claim 1, wherein at least one optical arm includes a variable delay apparatus configurable to implement one or more of a plurality of path length differences, to apply one or more of a plurality of time delays, such that one or more of a plurality of relative time delays is introduced.

12. The system as claimed in claim 11, wherein the variable delay apparatus comprises an optical switch and two or more optical arms arranged to introduce different delays to received pulses such that an optical switch setting determines the delay applied to incoming pulses.

13. The system as claimed in claim 1, wherein at least one optical arm includes a variable optical attenuator.

14. The system as claimed in claim 1, wherein the initial inter-pulse period is in a range 10-100 ns.

15. The system as claimed in claim 1, wherein the relative time delay is in a range 50 ps to 20 ns.

16. The system as claimed in claim 1, wherein one of the first optical arm and the second optical arm includes a variable optical attenuator configured to reduce an amplitude of the optical pulses in said optical arm relative to an amplitude of the optical pulses in the other of the first optical arm and the second optical arm.

17. The system as claimed in claim 16, comprising a control system configured to control attenuation provided by the variable optical attenuator.

18. The system as claimed in claim 12, comprising a control system configured to control the optical switch setting of the optical switch.

19. The system as claimed in claim 16, wherein the control system is configured to control settings of the variable optical attenuator.

20. The system as claimed in claim 16, wherein the variable optical attenuator comprises a MEMs electronically variable optical fiber attenuator, a manual mechanical fiber optic attenuator, a free space variable attenuator, a variable neutral density filter, or a waveplate and a polarizer.

* * * * *